United States Patent [19]

Michelet et al.

[11] Patent Number: 4,685,112

[45] Date of Patent: Aug. 4, 1987

[54] ELECTRICAL CONNECTION DEVICE INTENDED TO BE PLACED THROUGH THE WALL OF AN ELECTRICAL DIRECT-CURRENT METALLURGICAL FURNACE

[75] Inventors: Jacques Michelet; Ghislain Maurer, both of Metz, France

[73] Assignee: IRSID, Maizieres-les-Metz, France

[21] Appl. No.: 827,684

[22] Filed: Feb. 10, 1986

[30] Foreign Application Priority Data

Feb. 11, 1985 [FR] France ............................... 85 02276

[51] Int. Cl.$^4$ .............................................. H05B 7/00
[52] U.S. Cl. ....................................... 373/72; 373/108
[58] Field of Search ............................ 373/72, 108, 93

[56] References Cited

U.S. PATENT DOCUMENTS 1,234,947 7/1917 Sperling ................................. 373/72

FOREIGN PATENT DOCUMENTS 3316366 11/1984 Fed. Rep. of Germany ........ 373/93

Primary Examiner—Roy N. Envall, Jr.

Attorney, Agent, or Firm—Pollock, Vande Sande & Priddy

[57] ABSTRACT

The device according to the invention consists mainly of:
  an inner part passing through the wall of the furnace and comprising a metal core 7 extended by a cooled plug 10, the free end of the core opposite to the plug being in contact with the molten mass of metal present in the furnace,
  a sleeve 11 made of thermally conductive material, which is cooled as a result of the circulation of a cooling fluid and which surrounds the core 7,
  and means 29 of connecting the metal core 7 to an electrical supply.

The device according to the invention is characterized in that it also presents a separation space 12, formed between the sleeve 11 and the metal core 7, and an elastic fastening system 33, 34, 35 tending to return the said core 7 to its initial position given by assemblage.

The device according to the invention is advantageously used as a hearth electrode in direct-current arc furnaces, specially for the iron and steel industry.

9 Claims, 2 Drawing Figures

ELECTRICAL CONNECTION DEVICE INTENDED TO BE PLACED THROUGH THE WALL OF AN ELECTRICAL DIRECT-CURRENT METALLURGICAL FURNACE

FIELD OF THE INVENTION

The subject of the present invention is an electrical connection device intended to be placed through the wall of an electrical direct-current metallurgical furnace, usually through the bottom.

BACKGROUND OF THE INVENTION

One end of such devices is brought into contact with a molten mass of metal contained in the furnace, for example a bath of steel, whilst its other end is connected to a terminal of an electrical direct-voltage supply. The other terminal of the supply is conventionally connected to one or more movable vault electrodes usually located at a short distance above the bath of metal, to generate and maintain between them and the bath surface electric arcs which provide the thermal energy required for melting and processing the metal.

Such electrical connection devices are known in iron and steel industry as a hearth electrode, especially in processing or temperature-maintaining ladles or in arc furnaces for the smelting of solid metal-bearing materials.

One of the essential problems encountered in this field relates to the long-term resistance of these hearth electrodes which are subjected to severe thermal stresses because of their contact with the bath of molten metal and the high intensities of the electrical current passing through them, especially as regards arc furnaces, where these intensities can reach values of the order of 40,000 A and even above.

The applicant, who has given these problems much study, proposed, in French Patent Application No. 84/17323 of 6th Nov. 1984, a hearth electrode for a direct-current arc furnace which is particularly well suited to very long operating periods. This hearth electrode comprises essentially a steel core which passes through the wall of the furnace for coming with one end into contact with the molten mass of metal present in the furnace, the other end of which being encased in a sleeve made of thermally and electrically conductive material, advantageously copper. This sleeve, cooled by circulation of water, surrounds initially the core at a distance, so as to form a separation space between them. The latter is cyclically filled during "hot" periods, that is to say when the furnace is put into operation, and then reformed during the "cold" periods when the core cools after the current has been cut off. This contributes to allowing the steel core to expand and contract longitudinally within the sleeve in time with the repetitive remelting/resolidification sequences to which its portion not surrounded by the cooled sleeve is subjected and which result from the cyclical operation of the furnace.

Furthermore, the steel core is provided, at its end contained in the cooled sleeve, with a plug made of thermally and electrically conductive material which, like the sleeve, advantageously consists of copper cooled as a result of the internal circulation of a cooling fluid, and which is connected to a terminal of an electrical supply.

A hearth electrode of this type produces excellent results. Nevertheless, it was possible to observe by means of a displacement sensor that, during the furnace shutdown periods (or "cold" periods), the core and the attached plug therewith behaved in the manner of a sliding part which rose in the sleeve, and that this rise was repeated sequentially in the course of the remelting/resolidification cycles and could result in the gradual disappearance of the hearth electrode because of the consumption of its end in contact with the bath of metal.

OBJECT OF THE INVENTION

Thus, the object of the present invention is to solve this problem and thus further improve the long-term resistance of the hearth electrode.

SUMMARY OF THE INVENTION

For this purpose, the subject of the invention is an electrical connection device intended to be placed through the wall, usually the bottom, of a direct-current metallurgical vessel, in particular a metallurgical arc furnace, this device being of the type comprising:

an inner part consisting of a metal core which at one end is flush with the inner surface of the furnace and at the other end is provided with a plug, a sleeve made of thermally conductive material which has a cooling circuit and which surrounds the said inner part, and means of connecting the core to an electrical voltage supply, this electrical connection device being characterized in that it presents:

a separation space formed between the sleeve and the metal core, to allow for the phenomena of thermal expansion and contraction of the metal core in the sleeve, and an elastic fastening system for the said inner part, which continually tends to return the latter to its initial position given during the assembly of the device.

According to a preferred embodiment of the invention, the plug is made of a material which is both thermally and electrically conductive, advantageously copper or a copper alloy, and is cooled intensively as a result of the internal circulation of a cooling fluid, for example water.

In this case, the plug is advantageously connected to one terminal of the electrical supply and thus ensures that the metal core is connected electrically.

According to an alternative form of the embodiment mentioned above, the sleeve is likewise made of an electrically conductive material, thus allowing it to make the electrical connection of the metal core laterally, when the latter comes into contact with the sleeve during the "hot" periods of the furnace.

As will no doubt have been appreciated, the elastic fastening system ensures, during the remelting phases, that the metal core with its plug are returned to a constant position determined during assembly, this being achieved all the more easily because they can slide in the sleeve.

With the sole aim of making it easier to understand the invention, an attempt will be made to describe what happens in the region of the electrode during a core resolidification/remelting cycle, although the actual phenomena for all that still cannot be considered as all being explained completely.

Firstly it should be remembered that an arc furnace, whether of the alternating-current type or the direct-current type, usually has inside, on the bottom, a small cup, in which a small quantity of metal, called a "hot heel", is preserved after each casting and which is intended to make it easier to restart the smelting of a new batch. Of course, where a direct-current arc furnace is concerned, the hot heel can only perform its function if the hearth electrode projects into the cup.

Once this has been remembered, it is easier to understand that during "cold" periods of time, that is to say during the furnace shutdown sequences between two smelting operations, the "hot heel", which, when it solidifies, comes firmly up against the bottom of the cup, consequently, during the thermal contraction of the core which gradually cools, causes the latter to rise in the sleeve. It was thus found that there were, at the end of the cooling cycle, longitudinal shrinkages of the movable part of the hearth electrode, which could reach several mm.

During this cold period, this time because of the radial contraction of the metal core, the separation space provided between the latter and the cooled sleeve reforms, thus allowing the core to rise as a result of sliding. This rise of the metal core in the sleeve is accompanied by the stressing of the elastic fastening system (which is subjected to compression or extension, depending on whether it is a system with compression springs or draw springs).

In contrast to this, under "hot" conditions, that is to say when the metallurgical furnace is operating, the "hot heel" melts first. Fusion subsequently continues in the upper part of the non-cooled core which is embedded in the refractory lining of the vessel bottom.

This results in the disappearance of a large proportion of the anchoring points of the metal core in the refractory lining which appeared during the preceding solidification. However, this is not usually sufficient in itself to ensure that the movable part resumes, under the effect of its own weight, its initial position given by assemblage.

The elastic fastening system, still under stress because of the preceding shrinkage, then recovers its state of equilibrium and, by pushing the core towards the outside of the furnace, returns the latter to its initial position.

It will be noted, in this regard, that the presence of a separation space provided between the metal core and the sleeve assists the restoring action of the fastening system. In fact, the metal of the core, by being heated, fills this space as a result of radial expansion, whilst at the same time losing its consistency, and therefore without ever exerting a lateral pressure on the sleeve such that the restoring action of the fastening system is prevented. It is, however, possible for the elastic system to exert its restoring action before the radial expansion of the core completely fills the separation space relative to the sleeve. The precise mechanism still has to be described in specific detail, since it depends on several factors, such as the size of the core, the magnitude of the opposing force of the restoring system, the thickness of the refractory lining, etc.

Nevertheless, the elastic fastening system, together with the presence, under "cold" conditions, of a separation space between the metal core and the sleeve, allows the latter to resume its initial position reliably at each remelting, thus preventing any possibility of consumption of the core as a result of a cumulative effect of the longitudinal shrinkages in the sleeve.

BRIEF DESCRIPTION OF THE DRAWINGS

The above and other features of the invention will emerge from the following description given by way of example, with reference to the accompanying drawings in which.

SPECIFIC DESCRIPTION

Figure 1:
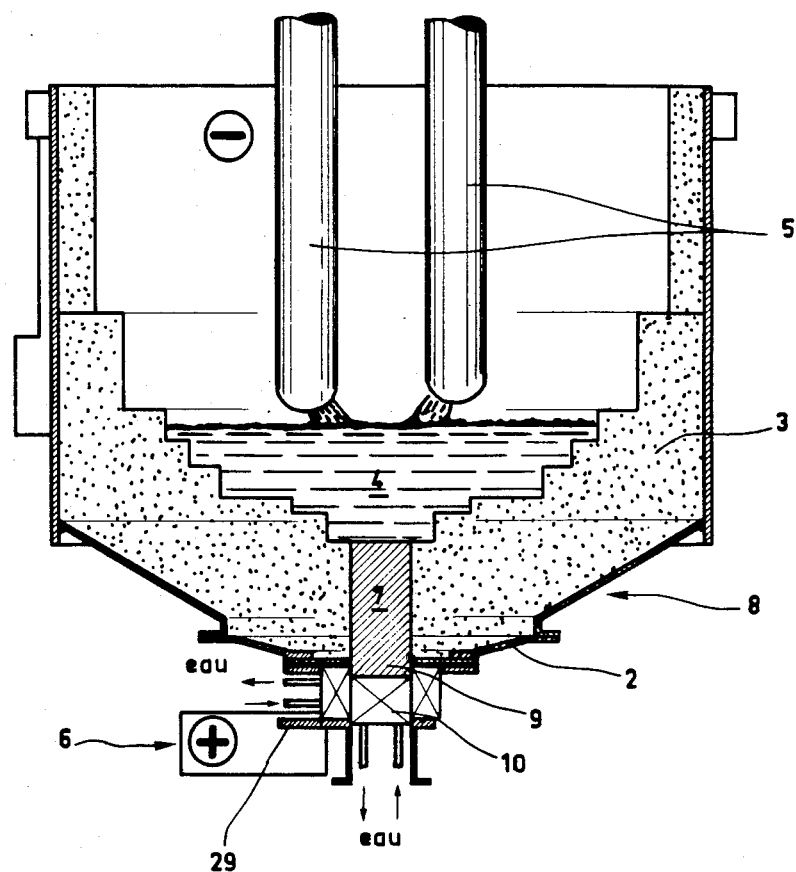
FIG. 1 shows, in longitudinal section, a general simplified view of a direct-current metallurgical arc furnace equipped, in its bottom, with a connection device according to the invention.

The arc furnace shown diagrammatically in FIG. 1 comprises a metal shell 2 covered on the inside with a refractory lining 3.

A mass of metal 4 has just been melted in this furnace by means of the electric arcs maintained between this mass and the end of graphite vault electrodes 5 (of which there are two in this example) connected to the same negative terminal of a direct-current electrical supply (not shown). The electrical circuit is closed via the bath between these electrodes and the connection device 6 according to the invention. As can be seen, this device comprises a metal core 7 formed by a simple steel billet and installed through the bottom 8 of the furnace, so that its upper end comes in contact with the molten mass. This contact is conventionally made at the base of a cup which is formed at a low point of the furnace and in which metal is permanently preserved, this metal usually being called a "hot heel" and being intended to make it easier to start the smelting of a solid batch.

At the opposite end, the billet 7 is extended, in its lower part 9, in the form of a screwed copper plug 10 cooled by means of the internal circulation of water.

Figure 2:
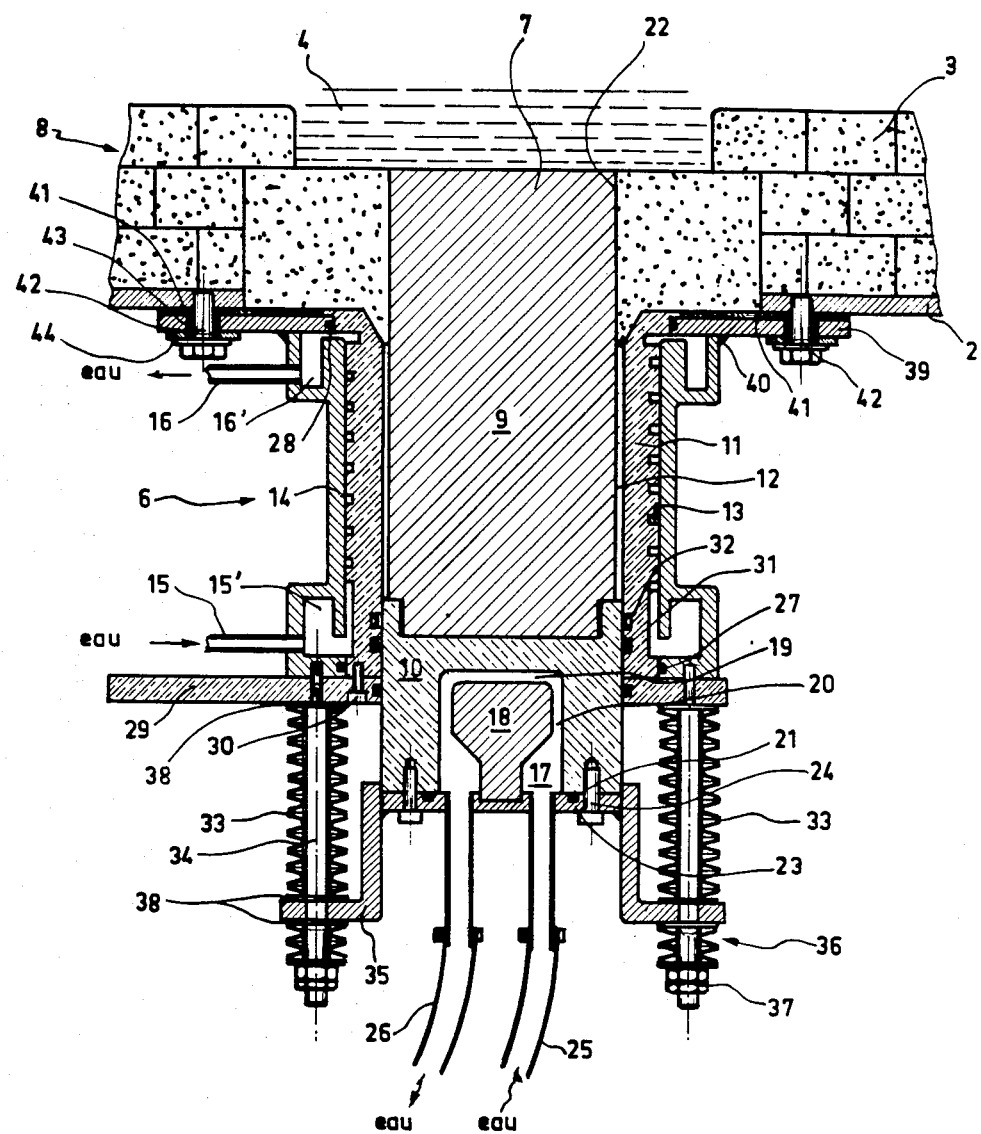
FIG. 2 shows, in longitudinal section, an enlarged and detailed view of this connection device.

As can be seen in detail in FIG. 2, the lower part 9 of the billet and the upper part of the plug 10 are encased in a sleeve 11 made of cooled copper, which surrounds the billet 7 at a distance, so as to form between them a separation space 12 which will be filled mainly as a result of the radial expansion of the billet when electricity is supplied to the furnace.

In contrast to this, between the sleeve 11 and the plug 10, both cooled, there only remains a guiding play to ensure that the plug 10 can slide in the sleeve 11.

In the example described, the length of the sleeved end portion 9 of the billet 7 is just sufficient to ensure that, during the cycles of thermal elongations and retractions of the core 7, the plug 10 will always slide within the sleeve 11, i.e., copper on copper.

Furthermore, in the example illustrated, the billet 7, the sleeve 11 and the plug 10 are of circular cross-section.

Here, the billet 7 is cooled by means of both the sleeve 11 and the connector 10. Thus, the sleeve 11 has on its outer lateral surface helical grooves 13 parallel to one another.

These grooves are closed in a leak-proof manner by means of a metal jacket 14 laid against the sleeve 11 and provided at its ends with inlet means 15, 15' and outlet means 16, 16' for the cooling fluid, which is advantageously demineralized water.

The plug 10 is recessed in its lower part to provide a substantially cylindrical cavity 17 open at its lower end. A metal kernel 18 is accommodated in the cavity 17. This kernel of general cylindrical shape has on its surface straight front grooves 19 and lateral grooves 20 for the circulation of cooling water.

The cavity 17 is closed in a leak-proof manner by means of the metal plate 23 fitted against the lower end of the plug 10 by means of screws 24, with an O-ring 21 interposed. The plate 23 is perforated with two orifices for the leak-proof connection of the water inlet and outlet 25 and 26.

The assembly consisting of the sleeve and jacket is sealed hydraulically by means of O-rings 27 and 28 arranged respectively at the upper and lower ends of the sleeve 11.

The electrical connection of the billet 7 is made jointly by means of the sleeve 11 and the plug 10. These thus form the two parallel branches of an electrical circuit connecting the core, this circuit being completed by a copper plate 29 connected to a terminal of an electrical supply (not shown) and intended to be in contact both with the sleeve 11 and with the plug 10.

The plate 29, which has an orifice for the passage of the plug 10, is fastened against the lower end of the sleeve 11 by means of bolts 30.

To maintain a sufficient mechanical play to allow the inner part 7, 10 of the hearth electrode to slide, sliding electrical contacts are provided between the plug 10 on the one hand and the sleeve 11 and plate 29 on the other hand.

In the embodiment illustrated, these electrical contacts consist of three annular copper rings 31 formed from elements of the "leaf-spring" type, each ring being inserted in an annular slot 32 made in the inner peripheral surface of the sleeve 11 and of the connecting plate 29, so that the flexible part of the ring 31 is in permanent elastic contact with the lateral surface of the plug 10.

According to an important characteristic of the invention, an elastic fastening system for the sliding part 7, 10 of the hearth electrode is intended, during remelting (supplying electricity to the electrical furnace), to be capable of returning this part (namely, the billet 7 and the plug 10 integral therewith) to its initial position given by assemblage.

In the embodiment illustrated in FIG. 2, the elastic fastening system mainly comprises compression springs consisting of conical metal washers 33, called "Belleville" washers, stacked with opposing conicity two by two. These springs are mounted round a guide column 34 and by means of their ends on one side about against a movable stop fixed to the sliding part 7, 10 and on the other side about against a fixed stop, i.e., one which is integral with the shell 2 of the furnace and which is located between this shell and the movable stop. In the embodiment illustrated as an example, the fixed stop consists of the electrical connection plate 29 itself, while the movable stop is formed by a sliding bearing 35 attached by means of welding to the plate 23 which closes the cavity 17 of the plug 10.

The columns 34 are fastened by screwing their end into the connection plate 29. Advantageously located at their other end which is left free, is a shock absorber 36 which also consists of a stack of "Belleville" washers. This stack is mounted between the bearing 35 sliding along the guide column 34 and a clamping nut 37 making it possible to adjust the initial compression exerted on the springs. Preferably, plane bearing washers 38 are provided at the ends of each spring.

The device according to the invention is fastened as a whole against the shell 2 of the furnace by means of the bottom plate 39, to which the jacket 14 is firmly attached by means of a welding bead 40. This plate 39 is itself fastened under the shell 2, with an electrically insulating plate 41 interposed. Passages are made for this purpose in the bottom plate 39 and in the plate 41 for the insertion of screws 42 fastening them to the shell 2 of the furnace. To maintain the electrical insulation of the shell 2 of the furnace, an electrically insulating barrel 43 completed by an insulating washer 44 is introduced into each passage provided for the screws 42.

The electrical contacts 31 consisting of annular copper rings formed by elements of the "leaf-spring" type do not necessarily bear elastically against the plug 10, but can bear elastically against the sleeve 11 and against the copper plate 29, and in this case the slots in which these rings are accommodated are made in the lateral surface of the plug.

Moreover, it is possible to use as an electrical connector for the steel billet means other than that described above and consisting of the copper plate 29 located at the base of the sleeve 11.

For example, the fastening plate 39 itself can be used as an electrical connector and in this case is advantageously made of copper.

Where the elastic fastening of the sliding part 7, 10 is concerned, embodiments other than that described are possible. For example, the system with a compression spring consisting of a stack of "Belleville" washers 33 can be replaced by a system with a draw spring which would be extended as a result of the shrinkage of the core during its resolidification. In this case, it is the movable stop 35 which will have to be located between the shell 2 of the furnace and the fixed stop of the springs.

We claim:

1. In an electrical connection device placed through the wall of an electrical direct-current metallurgical arc furnace an inner part consisting of a metal core (7) which at one end is flush with the inner surface of said vessel and at its other end and at its other end is extended in the form of a plug (10) integral therewith, a sleeve (11) of thermally conductive material which surrounds said inner part (7,10), is fastened to a shell (2) of said furnace, and has a cooling-fluid circulation circuit (13), and means (20,31) connecting said metal core to an electrical supply, the improvement comprising
  (a) a separation space (12) formed between said sleeve (11) and said metal core (7), to accomodate thermal expansion and contraction of said core in said sleeve; and
  (b) an elastic fastening system for said inner part (7,10), which tends to return the latter at any moment to a position given to it during assembly.

2. The improvement according to claim 1, wherein said elastic fastening system consists of an assembly of springs mounted between a fixed stop (29) attached to said shell (2) and a movable stop (35) fixed to said inner part (7,10).

3. The improvement according to claim 2, wherein said springs are compression springs, and said fixed stop (29) is located between said shell (2) and said movable stop (35).

4. The improvement according to claim 2, or 3, wherein said springs are mounted around columns (34) for guiding said movable stop (35).

5. The improvement according to claim 4, wherein said movable stop consists of a bearing (35) sliding along said guide columns (34) and fastened to said plug (10).

6. The improvement according to claim 3, wherein said spring assemblies consist of stacks (33) of conical metal washers.

7. The improvement according to claim 2, comprising shock absorbers (36) in an extension of spring assemblies beyond said movable stops (35).

8. The improvement according to claim 1, wherein said plug, and said plug has an inner cooling-fluid circulating circuit (19,20).

9. The improvement according to claim 6, wherein said sleeve (11) is made of a material which is a good conductor of electricity, and wherein means (29) are provided for connecting said plug (10) to the same terminal of the eletrical supply as said sleeve (11), so that said plug (10) and said sleeve (11) form two parallel branches of an electrical circuit connecting said metal core (7).

* * * * *